Oct. 19, 1965    KIYOSHI INOUE    3,213,319
SPARK DISCHARGE MACHINING APPARATUS WITH MEANS
FOR CLEARING SHORT-CIRCUIT FUSIONS
Filed May 2, 1960    2 Sheets-Sheet 1
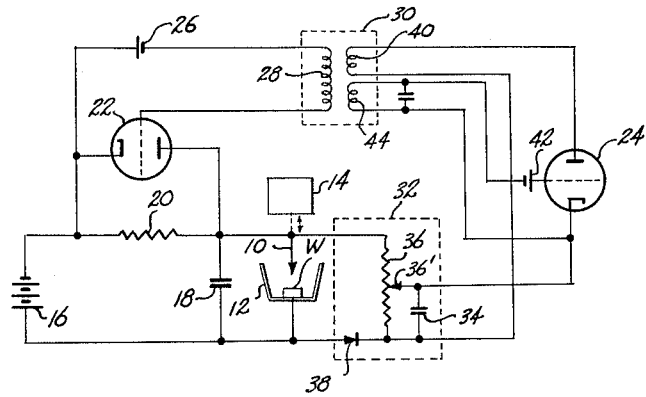
*Fig. 1.*
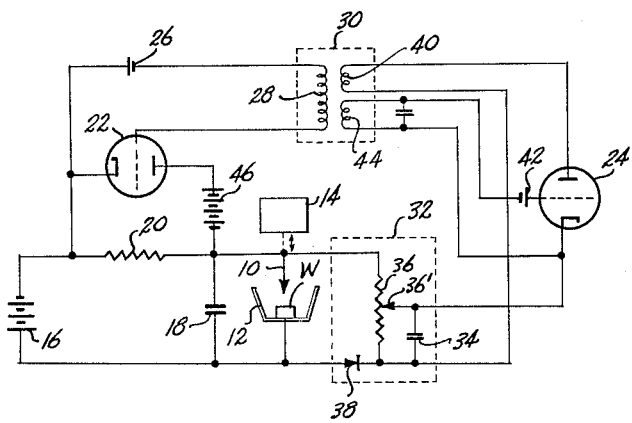
*Fig. 2.*
*Fig. 3.*
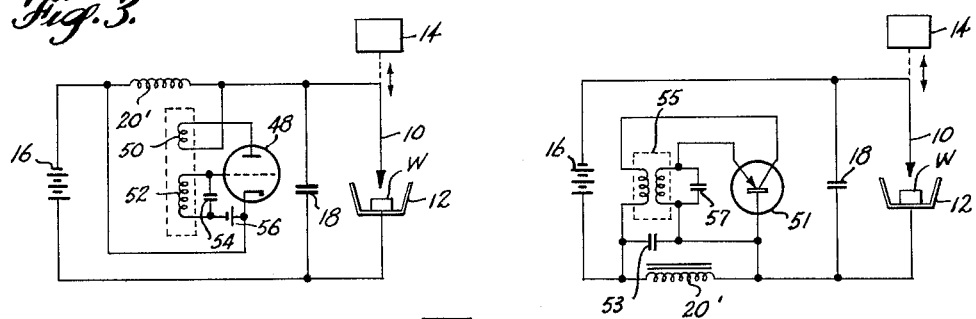
*Fig. 4.*
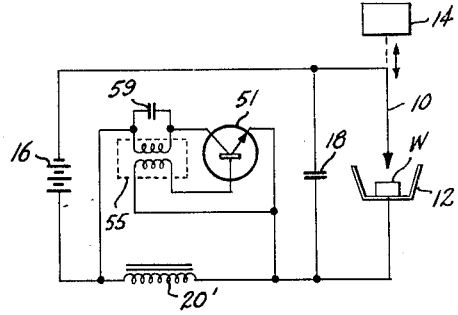
*Fig. 5.*
INVENTOR.
KIYOSHI INOUE
BY
Reynolds, Beach & Christensen
ATTORNEYS Oct. 19, 1965   KIYOSHI INOUE   3,213,319
SPARK DISCHARGE MACHINING APPARATUS WITH MEANS
FOR CLEARING SHORT-CIRCUIT FUSIONS
Filed May 2, 1960   2 Sheets-Sheet 2

INVENTOR.
KIYOSHI INOUE
BY
Reynolds, Beach & Christensen
ATTORNEYS

United States Patent Office 3,213,319
Patented Oct. 19, 1965

3,213,319
SPARK DISCHARGE MACHINING APPARATUS WITH MEANS FOR CLEARING SHORT-CIRCUIT FUSIONS
Kiyoshi Inoue, 182 Yoga Tamagawa Setagaya-ku, Tokyo, Japan
Filed May 2, 1960, Ser. No. 26,021
9 Claims. (Cl. 315—170)

This invention relates to improvements in electric spark discharge machining apparatus and more particularly concerns a new and improved means for removing the welds or fusions which occurs at times between the work piece and opposing electrode. The invention is herein illustratively described by reference to the presently preferred embodiments thereof; however, it will be recognized that certain modifications and changes therein with respect to details may be made without departing from the underlying essentials involved.

When, during the operation of spark discharge machining devices, the electrode and work piece become fused together by tips or particles of metal welded between them a very low impedance is presented across the energy storage condenser which precludes recharging the same and thereby interrupts normal machining operations. One prior proposal for overcoming this problem was to interpose in the storage condenser charging circuit a vacuum tube switch periodically rendered alternately conductive and non-conductive by means of a continuous-wave oscillator controlling the tube. While such an arrangement was effective to melt the short-circuit fusion metal across the discharge gap, it proved to be inefficient and costly as a result of the requirement that the entire flow of energy to the storage condenser and discharge gap pass through the vacuum tube switch. Moreover, in the case of a persistent short-circuit condition, not subject to removal by the intermittent flow of energy through the vacuum tube switch, there was danger of overloading and damaging the vacuum tube, without any provision for sensing and relieving an overload condition.

An object of the present invention is to provide a short-circuit clearing means in a spark discharge machining apparatus which will be more efficient in operation and less expensive in terms of apparatus cost than prior proposals.

A further object is the provision of a more economical and effective means to apply intermittent voltage impulses to the spark discharge gap in order to remove the fusions or welds which produce a short-circuit condition and without danger of creating arcs (viz., discharges of relatively long duration) which are damaging to the working surfaces. A related object is to achieve this end by means which will automatically protect itself against overload conditions in the case of a persistent short-circuit condition.

A further object of the invention is to provide an improved short-circuit clearing arrangement of an extremely simple nature which eliminates the necessity of a continuous-wave oscillator as a means to develop intermittent control impulses.

In accordance with the invention the means connected to the energy transfer circuit and operable for applying intermittent energy impulses to the spark discharge gap includes a delay means by which such energy impulses are inherently or automatically applied to the gap for a predetermined period following occurrence of a short-circuit condition and which terminate at the end of such period. The short-circuit clearing means are rendered responsive to the operating condition of the energy transfer circuit, i.e., the circuit for developing and applying the normal machining impulses to the spark discharge condenser and gap, so as to sense the short-circuit condition and upon its occurrence to apply the secondary energy impulses, preferably of a frequency higher than the normal machining impulse frequency, for a limited period of time thereafter. Such a system of control overcomes problems of overload of control elements by avoiding overly prolonged, yet futile attempts to clear persistent short circuits which require special operator attention; also such a control system is effective to avoid arcing in the spark gap.

In one form of the invention an intermittently "opened" and "closed" switch means are provided in shunt with the charging impedance for the energy storage condenser, such switch means being operated by an oscillatory source which is controlled by a voltage-detector circuit connected across the spark discharge gap, such voltage detector including delay means for maintaining the state of operativeness of the oscillatory circuit for a limited period of time following occurrence of a short-circuit condition at the gap. In another embodiment, the by-pass switch means connected in shunt to the charging impedance has in series with it a secondary direct-voltage supply in addition to the normal or primary supply in the energy transfer circuit, thereby to improve the efficiency and machining rate of the apparatus, as well as increasing the effectiveness of the apparatus to eliminate short-circuit conditions.

In still another embodiment, the means for applying intermittent energy impulses to the spark discharge gap in response to the occurrence of a short-circuit condition comprise a shock-excited resonant circuit, excitation of which, although fading out, persists for a certain period following occurrence of a short-circuit condition.

These and other features, objects and advantages of the invention will become more fully evident from the following description thereof by reference to the accompanying drawings.

FIGURE 1 is a schematic diagram of one embodiment of the invention, wherein the charging impedance for the energy storage condenser is by-passed by an oscillator-controlled vacuum tube switch.

FIGURE 2 is a variation of FIGURE 1 wherein a secondary energy source is connected serially with the vacuum tube switch.

FIGURE 3 is another modification wherein the vacuum tube switch is controlled by a shock-excited resonant circuit connected with the vacuum tube electrodes in a damped oscillator form of circuit.

FIGURE 4 is a modification somewhat similar to FIGURE 3, but employing a transistor circuit instead of a vacuum tube circuit.

FIGURE 5 is a variation of FIGURE 4.

Figure 7:
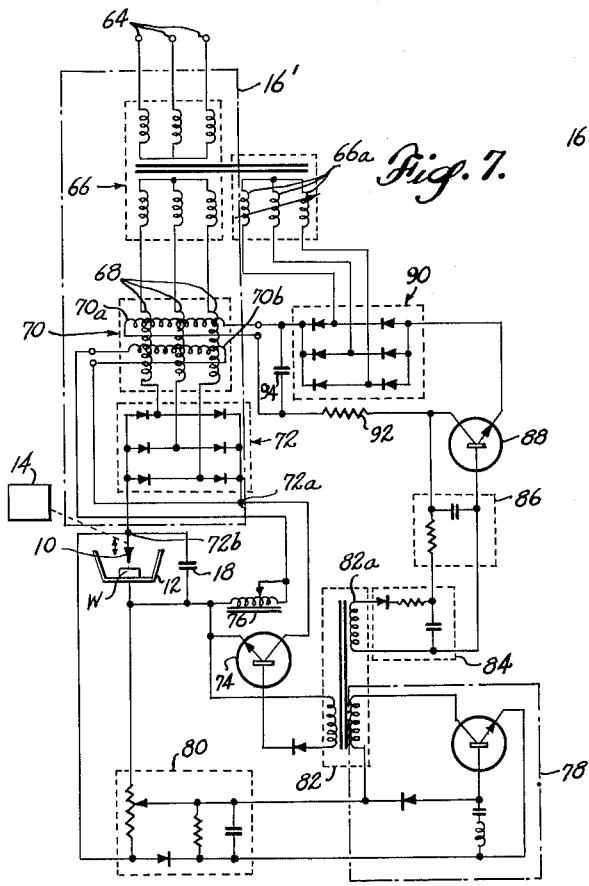
FIGURE 7 is a schematic diagram of a more elaborate circuit arrangement basically similar to the form shown in FIGURE 1, but employing transistors and including certain refinements.

Referring to the embodiment shown in FIGURE 1, the work piece W and electrode 10 are immersed in a suitable liquid medium, usually a dielectric liquid, contained within the tank 12 and are maintained in predetermined working relationship to form the customary close spark gap spacing therebetween. The gap distance is maintained by a servo means 14 mechanically connected to the electrode and operating in known manner. An energy storage condenser 18 connected directly across the spark discharge gap is charged from a direct-voltage source 16 through a series impedance 20 interposed in one of the connecting leads. Basically the circuit comprises a relaxation type oscillator wherein the condenser charges through the impedance 20 to a voltage at which the spark discharge gap ionizes, whereupon the condenser abruptly discharges through the gap in order to perform a machining function. The gap medium thereupon de-ionizes and the condenser is permitted to re-charge in order to initiate a succeeding cycle. In the event of a short-circuit condition occurring in the gap, as may occur because of unavoidable lags in the servomechanism, it will be observed that the impedance presented thereby across the condenser is so low that the condenser cannot re-charge and that, because of the presence of the series impedance 20 in the energy transfer circuit, there will be insufficient voltage available across the gap to melt or otherwise remove the metal particles or tips which bridge between the electrode and work piece, so that normal machining operations in such a basic circuit are then interrupted.

In accordance with this invention as shown in FIGURE 1, a vacuum tube switch 22 is connected in shunt to the charging impedance 20 and is controlled by means of an oscillator circuit comprising the vacuum tube 24. In the grid-cathode circuit of vacuum tube 22 a bias source 26 tends to maintain the vacuum tube 22 non-conductive, whereas the secondary winding 28 of an oscillator output transformer 30 is capable of applying intermittent or oscillatory voltages to the vacuum tube grid sufficient to override the bias and thereby render the vacuum tube intermittently conductive. The vacuum tube 22 is biased as a class C amplifier and thus serves as an intermittently operated switch.

Plate voltage for operating the oscillator 24 is derived from a voltage-detector circuit 32 which includes a resistance-capacitance combination and a rectifier. In this case the capacitance 34 is connected in shunt to that portion of the potentiometer winding 36 which is located between one end of the winding and the movable potentiometer wiper 36'. The rectifier 38 is interposed in one of the connecting leads between the spark discharge gap and the resistance-capacitance combination. One side of the condenser 34 is connected through transformer primary 40 to the plate of vacuum tube 24 whereas the opposite side of condenser 34 is connected to the cathode of this vacuum tube. The grid of the vacuum tube is connected through a bias source 42 and a transformer winding 44 to the cathode, providing the necessary oscillator feedback.

In this circuit, during normal machining operation, the voltage-detector circuit provides a substantially constant plate voltage for the oscillator tube 24 and maintains the oscillator in an operative state. The oscillation frequency of the circuit is established at a value which is preferably higher than the basic impulse machining frequency of the energy transfer circuit comprising source 16, impedance 20, condenser 18 and the spark discharge gap. When the work material W is of a relatively hard nature, such as cemented tungsten carbide or the like, it is preferred that the frequency of oscillator 24 be as high as of the order of ten times the basic operating frequency of the spark discharge energy transfer circuit. However, in the case of machining iron or mild steel, for example, this frequency ratio may be reduced advantageously to of the order of two or three, for example. During normal machining operation the intermittent high-frequency operation of vacuum tube switch 22 causes this vacuum tube to carry a portion of the energy which charges condenser 18 and operates in the spark discharge gap. Typically, the average current which passes through the vacuum tube switch 22 will be of the order of ten to twenty percent of the total machining current. However, for fine finishing type of machining work this percentage may be increased to as high as eighty or ninety percent to advantage under certain conditions. It will be understood that the operating conditions, the type of work, the type of medium used as the machining fluid, the machining speed and other conditions will, in a given case, determine the relative impedances which should exist as between the vacuum tube switch 22 and the charging impedance 20. Another variable bearing on the same design choice is the percentage of the total cycle of oscillator 24 during which the vacuum tube switch 22 is rendered conductive. This may be determined by selection of the bias voltage of bias source 26, also by the wave form delivered by the oscillator 24 through the transformer 30 as the switching voltage for the vacuum tube 22.

Normally machining current which is supplied to the storage condenser 18 is delivered primarily through the impedance 20. However, in the event of a short-circuit condition at the gap the stored energy in condenser 34 does not immediately disappear, but provides a prolonging or delay effect by which the oscillator 24 is maintained operative as a high-frequency switching control source for a predetermined period following occurrence of the short-circuit condition. Thus, intermittent impulses of energy are applied to the spark discharge gap which under usual conditions are sufficient to clear the gap of the fusions or welds of metal between the electrode 10 and work piece W. However, in the event of a persistent or aggravated short-circuit condition, if the short circuit is not removed by the time the condenser 34 discharges and the oscillator 24 becomes inoperative, then special attention is required in any case and the desirable effect of sparing the vacuum tube switch 22 from overload is automatically achieved. Thus, when oscillator 24 becomes inoperative, tube 22 returns to the non-conductive state and special measures must be taken to clear the gap of the short circuit. This may be done by suitable operator techniques already known in the art and requiring no description herein. Special warning apparatus may be provided to indicate an uncleared short-circuit condition, if desired, although an alert operator can readily determine it by load current meter readings and by the changes of audible noise from the apparatus. However, with the novel apparatus most short-circuit conditions are instantly cleared and there is no loss of operating time and no undesired arcing at the electrode.

With the improved circuit described and illustrated in connection with FIGURE 1, the vacuum tube switch 22 need have only a small fraction of the capacity of the switching tubes used heretofore and will therefore be relatively inexpensive and long lived. Moreover, the requirement that only a fraction of the total machining current need be switched on and off by this tube results in circuit efficiency.

In the variation shown in FIGURE 2, parts which correspond to parts in FIGURE 1 bear similar reference numerals. In this case a secondary direct voltage source 46 is connected serially with the vacuum tube switch 22 across the charging impedance 20. During normal machining operation intermittent conduction through tube 22 results in the charging of condenser 18 to a voltage which is proportional to the sum of the voltages of the sources 16 and 46. Under short-circuit conditions the intermittent voltage applied across the spark discharge gap for a limited time period is also proportional to the sum of these two source voltages. Thus, in effect, the apparent internal resistance of vacuum tube 22 is decreased and the effect of the intermittent energy impulses applied to clear a short-circuit condition is increased. This increases the capability of the circuit to clear short circuits and also increases the normal machining speed of the machine.

In the embodiment of FIGURE 3, the charging impedance 20' comprises a choke or reactance, across which is connected the plate-cathode circuit of a shock-excited oscillator including vacuum tube 48. The plate lead of this oscillator is connected through the transformer winding 50 to the side of choke 20' adjacent the electrode 10. The transformer feedback winding 52 is connected between the cathode and grid of the oscillator tube 48, and is by-passed by a condenser 54 which provides a resonant circuit in conjunction with the transformer winding 52. A bias source 56 renders the oscillator tube 48 normally non-conductive. The cathode of the oscillator is connected to the side of the choke 20' adjacent to the source 16.

During normal machining operations the intermittent charging and discharging of condenser 18 produces increases and decreases in the voltage which exists across the choke 20'. These voltage transients are used to shock excite the oscillator 48 and during normal operation of the circuit a ripple or fluctuation of voltage applied to the spark discharge gap occurs by reason of the presence of oscillator tube 48 in by-pass relation to the choke 20'. However, upon occurrence of a short-circuit condition at the spark discharge gap the resultant steady-state flow of current through the choke 20', lacking the surges which attend normal machining, causes the oscillator to become inoperative, with the tube 48 biased to the non-conductive state for its own protection. There is a certain delay, however, in the extinguishment of oscillations in the oscillator tube 48 as a result of the storage of energy in the transformer windings and in the condenser 54 of the resonant circuit, and during this delay or carry-over period a series of impulses are applied to the spark discharge gap which will usually be sufficient to remove the fusions or welds of metal producing the short circuit. However, as in the preceding embodiment, in the event of a persistent short-circuit condition, separate measures are required to accomplish the result and the principal function of the circuit is to protect the switching tube 48.

FIGURES 4 and 5 represent variations of the circuit shown in FIGURE 3, wherein the circuit responds to certain frequency components of the voltage transients occurring across the charging impedance 20' and shock excites the oscillator. In FIGURES 4 and 5, however, transistor 51 is used in lieu of a vacuum tube, such as tube 48 in the preceding embodiment. In FIGURE 4 a condenser 53 is connected in shunt to the choke 20' and from respectively opposite sides of this condenser connections are made to the emitter and collector terminals of the transistor 51 through the respective windings of oscillator transformer 55. One of these windings is by-passed by a condenser 57 to establish oscillator frequency. In FIGURE 5 the transistor is connected in a revised circuit wherein the condenser 53 across the choke is omitted and the transistor is of a different type in terms of polarity of its electrodes. In this case the transistor base is connected to the side of choke 20' adjacent the spark discharge gap through one winding of the oscillator transformer 55 whereas the transistor emitter is connected directly to the same side of the choke. The transistor collector is connected through the other winding of transformer 55 to the opposite side of choke 20' and is by-passed by a resonating condenser 59. In both of these circuits (FIGURES 4 and 5) an intermittent or ripple voltage is superimposed on the direct charging voltage applied to the condenser 18 during normal machining operations, whereas a series of impulses is applied to the spark discharge gap in response to the occurrence of a short-circuit condition in the gap. These impulses terminate, however, after a predetermined period of time, determined by the energy storage capacity and "Q" factor of the elements in the oscillator circuit, so that in the event of a persistent short-circuit condition the transistor 51 is protected against overload.

Figure 6:
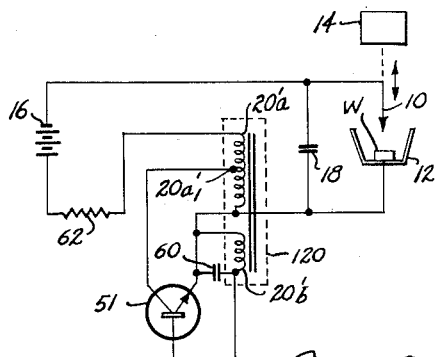
FIGURE 6 is another variation using a transistor as the switching element.

In the modification shown in FIGURE 6 choke 20'a comprises one winding of a transformer 120. Another winding of this transformer 20'b is connected between the emitter and base electrodes of transistor 51 and is by-passed by a tank circuit condenser 60. A tap 20'a₁ on choke winding 20'a is connected to the collector of transistor 51, whereas the end of choke 20'a opposite that end connected to condenser 18 is connected through a charging resistance 62 to a terminal of the voltage source 16. The circuit oscillates in response to frequency components of the transient voltages occurring across the choke winding 20'a and the effect is generally similar to that obtained in the immediately preceding embodiments.

In the embodiment shown in FIGURE 7, the primary direct voltage source 16' comprises the alternating current three-phase input terminals 64 connected to the primaries of the input transformer 66. One set of secondary windings of this transformer are connected through the reactance windings 68 of a saturable reactor 70 to a full-wave rectifier bridge 72 having output terminals 72a and 72b. The saturable reactor 70 has two control windings, designated 70a and 70b, respectively. Transistor 74 serves as the intermittently operated switch means connected in by-pass relation to the charging impedance choke 76. The emitter of transistor 74 is connected to the common junction between condenser 18 and choke 76, whereas the collector of the transistor is connected through the control winding 70b to the opposite side of choke 76 as shown. A transistor oscillator 78, energized by the voltage detector circuit 80 which is connected across the spark discharge gap (10, W) applies oscillating control voltage to the control electrodes (emitter, base) of transistor 74 through the transformer 82.

Transformer 82 has an auxiliary secondary winding 82a which is connected to the input of a second voltage-detector circuit 84 which in turn is connected through the R-C delaying or storage circuit 86 to the control electrodes (collector, base) of a transistor amplifier 88. Supply voltage for this transistor amplifier is developed by the auxiliary set of secondary windings 66a of the three-phase transformer 66, and the full-wave rectifier bridge circuit 90. A resistance 92 and capacitance 94 serve as a filter for this direct voltage source.

In the operation of the circuit shown in FIGURE 7, under normal machining conditions oscillator 78 is rendered operative by the application of voltage thereto from the voltage-detector circuit 80, and the switching transistor 74 is thereby rendered intermittently conductive, preferably at a frequency which materially exceeds the basic frequency of operation of the spark discharge energy transfer circuit comprising source 16', condenser 18, choke 76 and the spark gap. Under these conditions voltage is also developed by voltage-detector circuit 84 which maintains the amplifier 88 operative to energize the control windings 70a and thereby minimize the reactance of the reactance windings 68 interposed serially between transformer 66 and the rectifier bank 72. The function of control winding 70b of the saturable reactor is to control the voltage developed by the supply 16' as a function of machining current flow through the spark discharge gap in according with principles set forth in Patent No. 2,924,751 by the present applicant. When a short-circuit condition develops at the spark discharge gap, the resultant drop of voltage occurring across the gap initiates a decay of voltage at the output of voltage-detector circuit 80 and thereby a delayed deenergization of oscillator 78. During this decay, however, a succession of impulses are applied, through transistor 74, to the spark discharge gap which will remove any short-circuit fusion metal or the like unless the short-circuit condition be aggravated or extreme. In that event, the resultant decay of energization of the oscillator 78 results in the substantial non-conductivity of transistor 74 after a predetermined time period and also results in the deenergization of the control winding 70a of variable reactance 70. Consequently, as a result of these two effects, circuit elements are protected against overload in the event of an aggravated short-circuit condition which persists after the termination of the series of impulses delivered by switching transistor 74.

Figure 8:
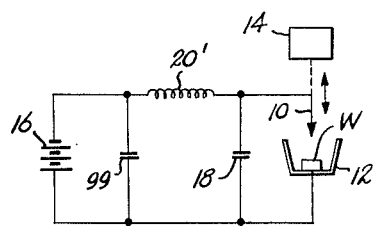
FIGURES 8, 9 and 10 are variations of a modified embodiment wherein the intermittent short-circuit clearing impulses are applied by shock-excited resonant circuit means employing no vacuum tube switches and deriving their shock-excitation energy from the voltage changes occurring across the spark discharge gap.

In FIGURE 8 the intermittent impulses intended to clear the spark discharge gap of short-circuit metal are developed by means other than a by-pass switch for the charging impedance 20'. In this instance, an auxiliary condenser 99 is connected across the machining source 16 and, in conjunction with choke 20' and storage condenser 18, forms a resonant circuit which results in relatively high-frequency waves being applied to the discharge gap as a result of the shock excitation of the circuit caused by each discharge of the condenser 18 through the gap. In the event of a short-circuit condition the energy impulses applied to the gap as a result of the damped resonant oscillation in the circuit are usually sufficient to clear the gap, although in the case of a persistent or aggravated short-circuit condition other measures will, of course, have to be taken.

Figure 9:
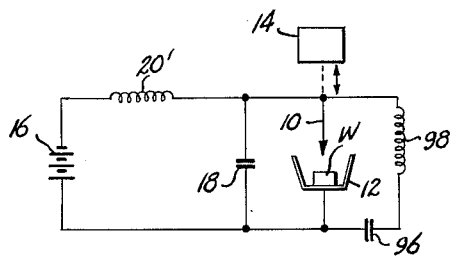

In FIGURE 9, a high-frequency resonant circuit is formed by the combined effect of condenser 18, condenser 96 and reactance 98 which, during machining operation, is shock excited with each discharge of condenser 18 through the spark discharge gap in order to deliver a succession of energy impulses or oscillations to the gap on every cycle of operation. In the event of a short-circuit condition at the gap, these energy impulses which occur on the last succeeding discharge of the condenser are usually sufficient to clear the gap of short-circuit fusion or weld metal and thereby restore normal machining conditions. However, in the event of a persistent short-circuit condition of an aggravated nature, the absence of repeated charging and discharging cycles with respect to condenser 18 causes the shock excited resonant circuit to remain inoperative.

Figure 10:
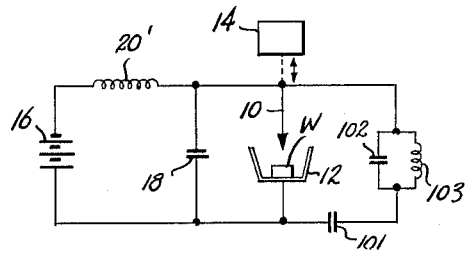

In FIGURE 10, a primary resonant circuit is formed by auxiliary choke 103, condenser 18 and auxiliary condenser 101, and a secondary resonant circuit is formed by condenser 102 connected in shunt to choke 103. Under normal machining conditions in this circuit, oscillating voltage is supplied to the spark discharge gap by the primary resonant circuit formed by reactance 103, condenser 101 and condenser 18. In the case of a short circuit in the discharge gap, oscillating voltage, preferably at a substantially higher frequency, is applied by the secondary resonant circuit in order to melt the fusion metal producing the short circuit in the gap. Actually, as in the immediately preceding embodiments, both the resonant circuits operate during normal machining conditions the secondary resonant circuit being shock excited with each discharge of condenser 18, and in the event of a short-circuit condition it is these latter oscillations which are usually effective to clear the short circuit.

The circuits shown in FIGURES 8, 9 and 10 are very simple and economical in terms of apparatus cost and operating cost. As in the preceding embodiments, they also depend for their principal operating function upon response to cessation of the normal operating condition of the circuit. They achieve this, as do the preceding embodiments, without danger of producing arcing and in a manner avoiding useless and even damaging application of energy to the gap over a prolonged period in the event of an aggravated or persistent short-circuit condition. In all cases normal machining is usually instantly restored because the succession of impulses delivered to the gap following the inception of a short-circuit condition is usually sufficient to clear the gap. In the event it is not cleared, the circuit inherently returns to a quiescent state wherein any elements requiring protection against overload currents are inherently protected.

These and other aspects of the invention will be recognized by those skilled in the art on the basis of the foregoing description and accompanying illustrations.

I claim as my invention:

1. In a spark discharge machining apparatus, means including an electrode, forming a spark discharge gap between a work piece to be machined and such electrode, a storage capacitance connected in shunt across said gap, a source of direct voltage, means including a series impedance connecting said source across said gap and said capacitance to form a charging circuit for said capacitance, whereby oscillations occur comprising alternate charging of said capacitance from said source and discharging thereof through said gap at a predetermined frequency determined by the gap and circuit parameters during normal machining operation, normally open switch means connected in shunt across said series impedance, and control means for intermittently closing said switch means to provide a by-pass around said series impedance at a frequency greater than said predetermined frequency, said control means including a source of control oscillations operatively connected to said switch means, and voltage-detector circuit means connected between said gap and said oscillation source for biasing the latter into an operative state only during intermittent charging and discharging of the capacitance, said voltage-detector circuit having a delayed discharge characteristic maintaining said control oscillation source operative for a predetermined period immediately following occurrence of a short-circuit condition in said gap.

2. The apparatus defined in claim 1, wherein the switch means comprises an electronic translation device having a control element connected to the oscillator means, and wherein the voltage-detector circuit comprises a resistance and capacitance combination connected across the gap, and a rectifier element interposed serially in the latter connections whereby during normal spark discharge operation at the gap the latter capacitance maintains a bias voltage applied to the oscillation source.

3. The apparatus defined in claim 1, wherein the first-mentioned source includes a source of alternating current, rectifier means, and means including a variable impedance connecting said alternating current source to said rectifier means, said variable impedance having a control element operable by a change of energization thereof to increase the impedance of said variable impedance and thereby reduce the voltage of said first-mentioned source, and means connected to said latter control element for effecting such a change of energization in response to a short-circuit condition at said gap, said latter means having an input responsively connected to the voltage-detector circuit means.

4. In a spark discharge machining apparatus, means including an electrode, forming a spark discharge gap between a work piece to be machined and such electrode, a storage capacitance connected in shunt across said gap, a source of direct voltage, means including a series impedance connecting said source across said gap and said capacitance to form an energy transfer circuit, whereby oscillations occur comprising alternate charging of said capacitance from said source and discharging thereof through said gap at a predetermined frequency determined by the gap and circuit parameters during normal machining operation, and a source of pulsating energy connected across said series impedance and operable when excited to apply a pulsating voltage of higher frequency than said predetermined frequency to said gap, said latter source having means responsively connected to said transfer circuit for exciting the same substantially continuously in response to normal machining operation of said circuit.

5. The apparatus defined in claim 4, wherein the source of pulsating energy comprises an electronic amplifier means having primary electrodes forming a circuit path connected in shunt across the series impedance and having a control electrode, and oscillation circuit means connected between said control electrode and the energy transfer circuit for intermittently increasing conductivity of the amplifier means, said oscillation circuit means having resonant circuit means establishing the oscillation frequency of said oscillation circuit.

6. The apparatus defined in claim 5, wherein the oscillation circuit means includes a voltage source connected to the amplifier means for rendering the same operative, said latter voltage source including a voltage-detector circuit connected across the gap and including a rectifier element in series with a resistance-capacitance combination.

7. In a spark discharge machining apparatus, means including an electrode, forming a spark discharge gap between a work piece to be machined and such electrode, a storage capacitance connected in shunt across said gap, a source of direct voltage, means including a series impedance connecting said source across said gap and said capacitance to form an energy transfer circuit, whereby oscillations occur comprising alternate charging of said capacitance from said source and discharging thereof through said gap at predetermined frequency determined by the gap and circuit parameters during normal machining operation, and means including elements forming a circuit path by-passing said impedance to carry a portion of the current in said energy transfer circuit, said latter means being connected to said energy transfer circuit for operation thereby to be rendered alternately conductive and relatively non-conductive at a frequency exceeding said predetermined frequency, during normal machining operation, and energy storage means delaying inoperativeness of said means following short circuiting of the gap.

8. In a spark discharge machining apparatus, means including an electrode, forming a spark discharge gap between a work piece to be machined and such electrode, a storage capacitance connected in shunt across said gap, a source of direct voltage, means including a series impedance connecting said source across said gap and said capacitance to form an energy transfer circuit, whereby oscillations occur comprising alternate charging of said capacitance and from said source discharging thereof through said gap at predetermined frequency determined by the gap and circuit parameters during normal machining operation, and means connected across said series impedance for applying intermittent energy impulses to said gap during normal machining operation, said latter means being responsively connected to the energy transfer circuit and having delay means continuing such intermittent energy impulse application for a predetermined period following short circuiting of the gap.

9. In a spark discharge machining apparatus, means including an electrode, forming a spark discharge gap between a work piece to be machined and such electrode, a storage capacitance connected in shunt across said gap, a source of direct voltage, means including a series of impedance connecting said source across said gap and said capacitance to form an energy transfer circuit, whereby oscillations occur comprising alternate charging of said capacitance from said source and discharging thereof through said gap at a predetermined frequency determined by the gap and circuit parameters during normal machine operation, and means connected for applying intermittent energy impulses to said gap, said latter means being connected across said series impedance and being responsive to normal charging and discharging of the capacitance to apply a succession of energy impulses to said gap at a frequency higher than the normal charging and discharging frequency, and being operable to reduce the amplitude of said succession of impulses in response to a reduction of mean voltage across said gap.

References Cited by the Examiner

UNITED STATES PATENTS

| | | |
|---|---|---|
| 2,798,934 | 7/57 | Bruma. |
| 2,804,575 | 8/57 | Matulaitis. |
| 2,951,969 | 9/60 | Matulaitis et al. _____ 315—163 |
| 3,054,931 | 9/62 | Inoue _____ 315—244 X |
| 3,089,059 | 5/63 | Porterfield et al. _____ 315—243 X |

GEORGE N. WESTBY, *Primary Examiner.*

RALPH G. NILSON, *Examiner.*